June 25, 1957  E. A. HILTON  2,796,830
DATA CONTROLLED SELECTIVE PRINTING SYSTEM
Filed Nov. 1, 1956  6 Sheets-Sheet 1
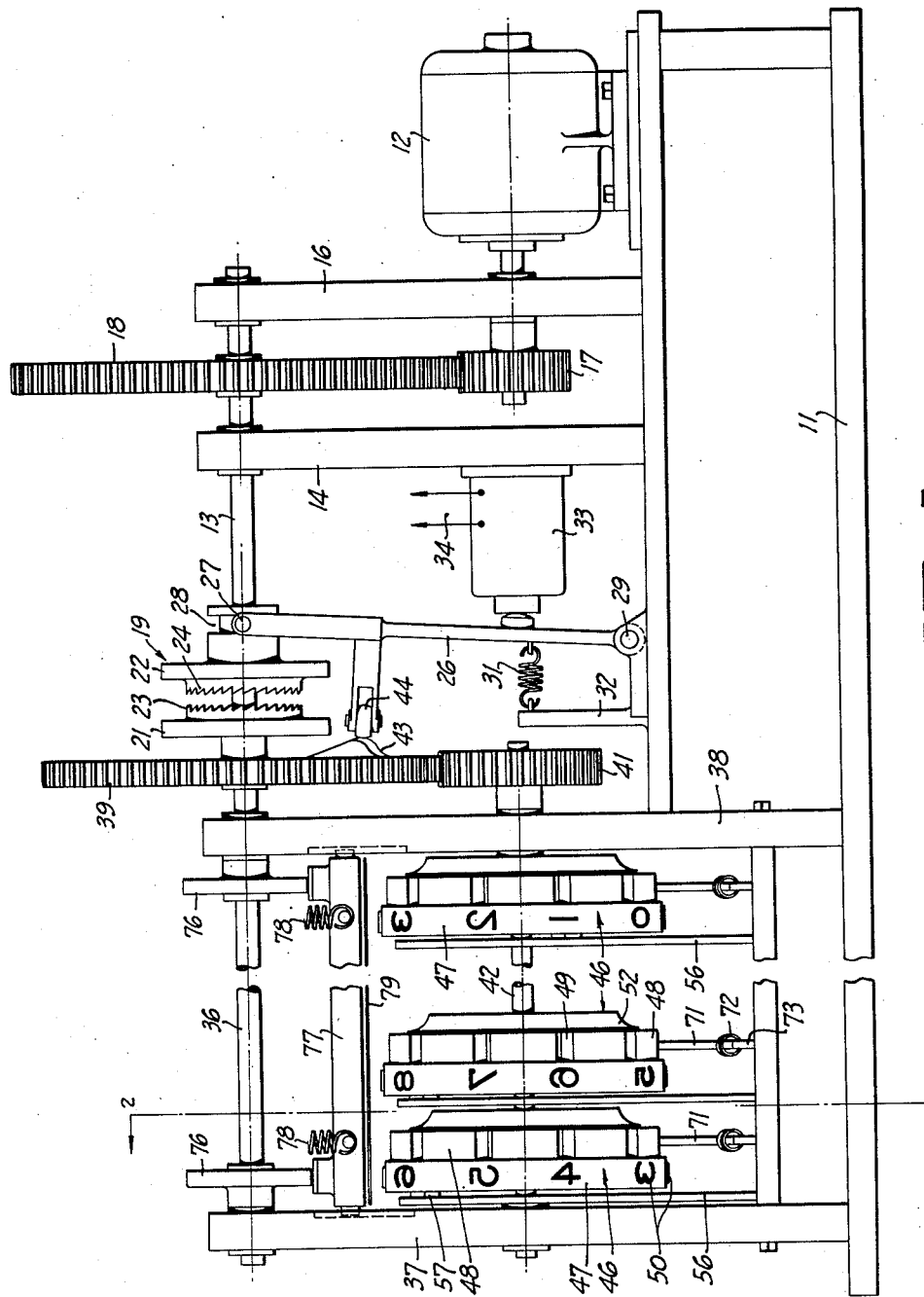
INVENTOR.
Edgar A. Hilton
BY
ATTORNEYS

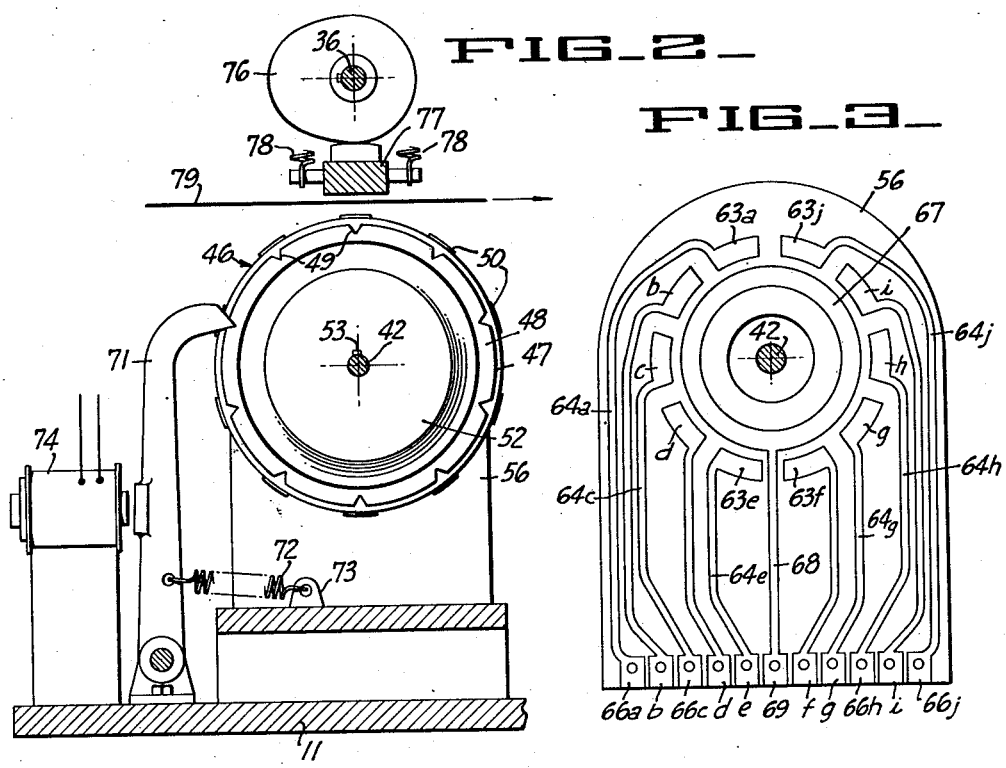
FIG_2_
FIG_3_
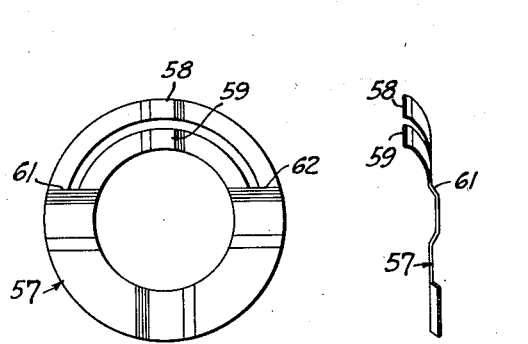
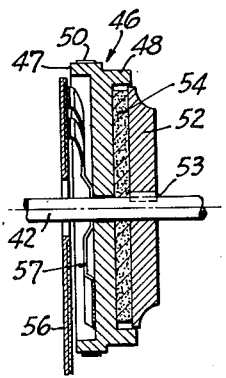
FIG_4_  FIG_5_
FIG_6_
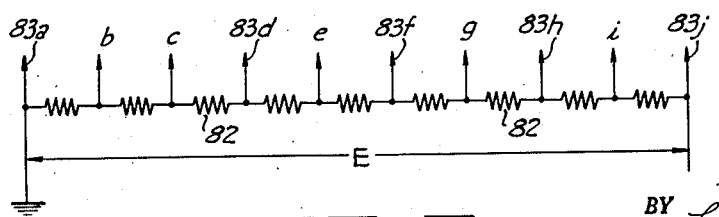
FIG_7_
INVENTOR.
Edgar A. Hilton
BY
ATTORNEYS

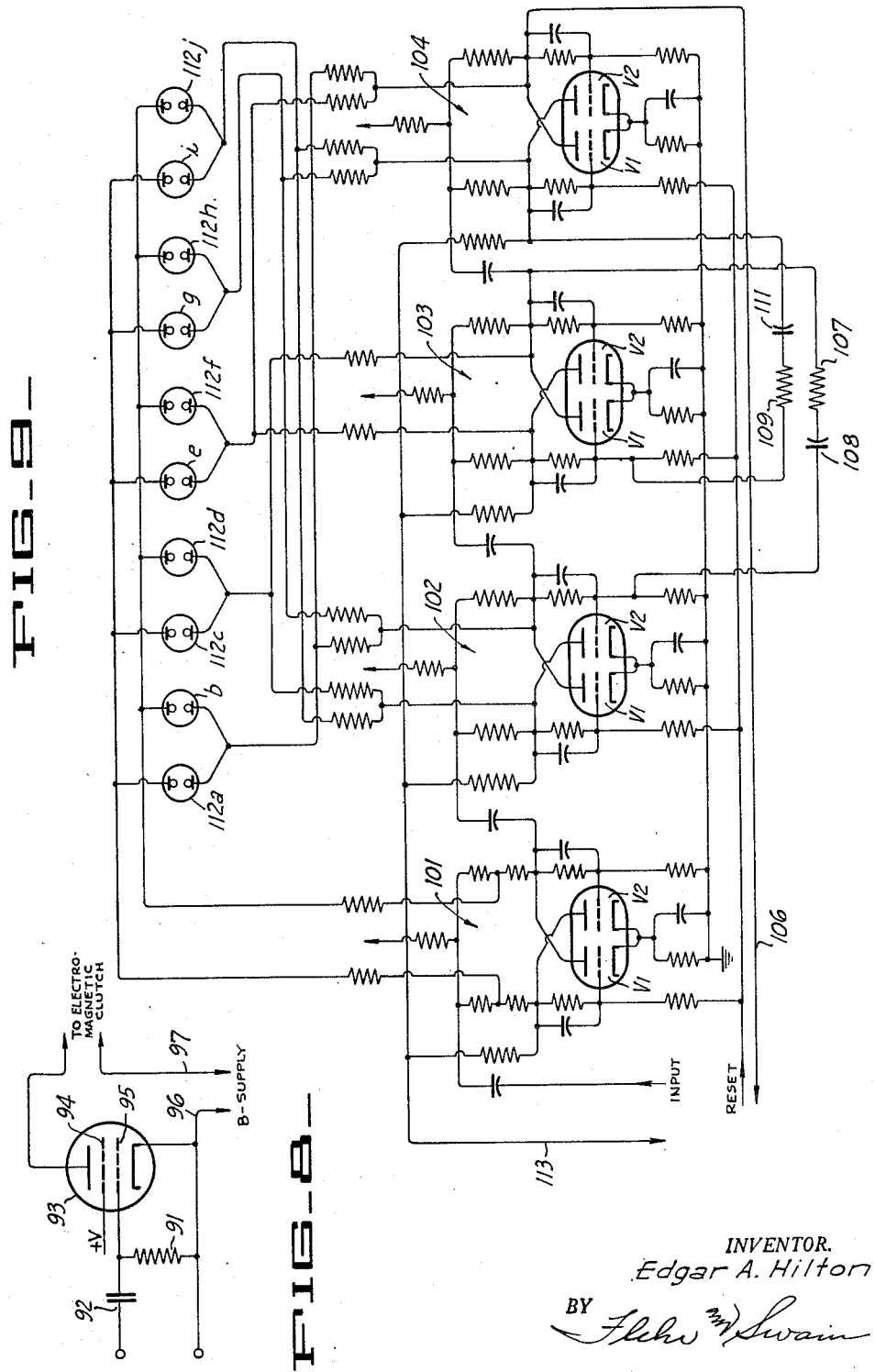

June 25, 1957     E. A. HILTON     2,796,830
DATA CONTROLLED SELECTIVE PRINTING SYSTEM
Filed Nov. 1, 1956     6 Sheets-Sheet 4
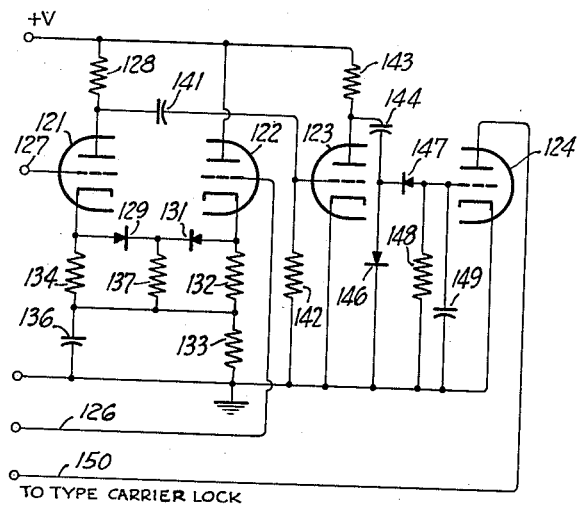
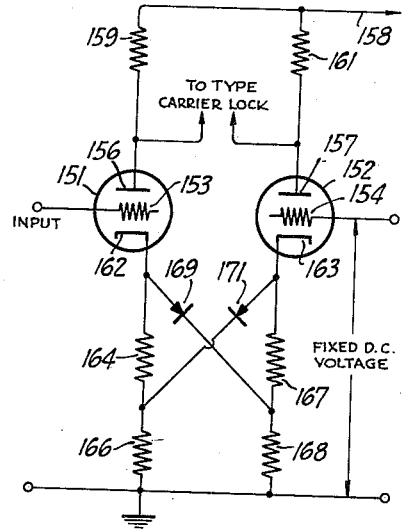
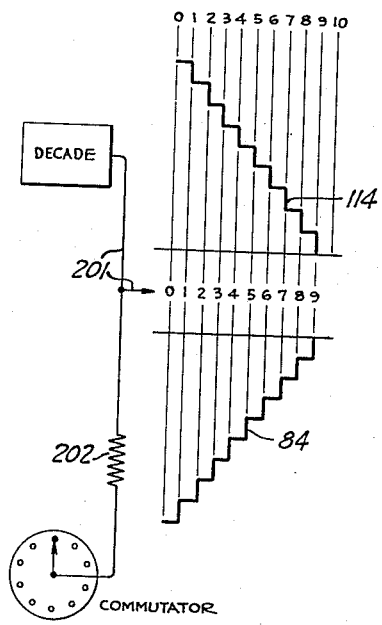
INVENTOR.
Edgar A. Hilton
BY
ATTORNEYS June 25, 1957  E. A. HILTON  2,796,830
DATA CONTROLLED SELECTIVE PRINTING SYSTEM
Filed Nov. 1, 1956  6 Sheets-Sheet 5
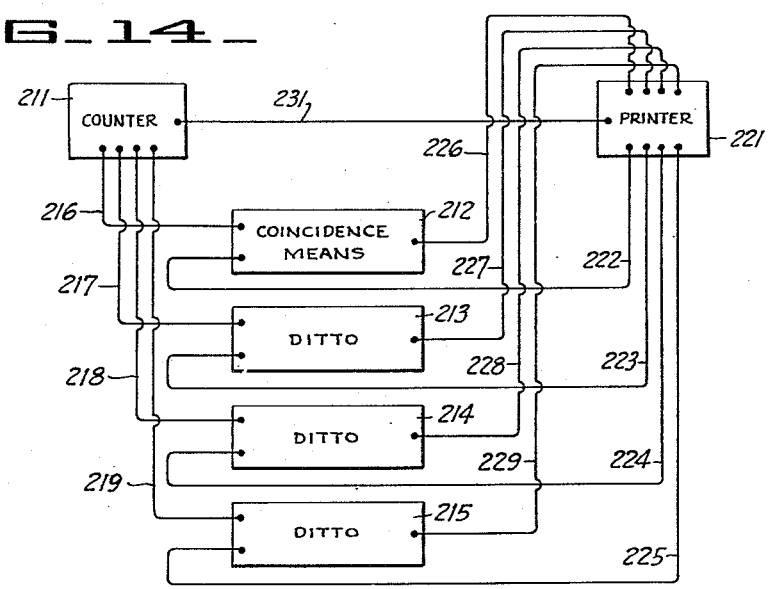
FIG_14_
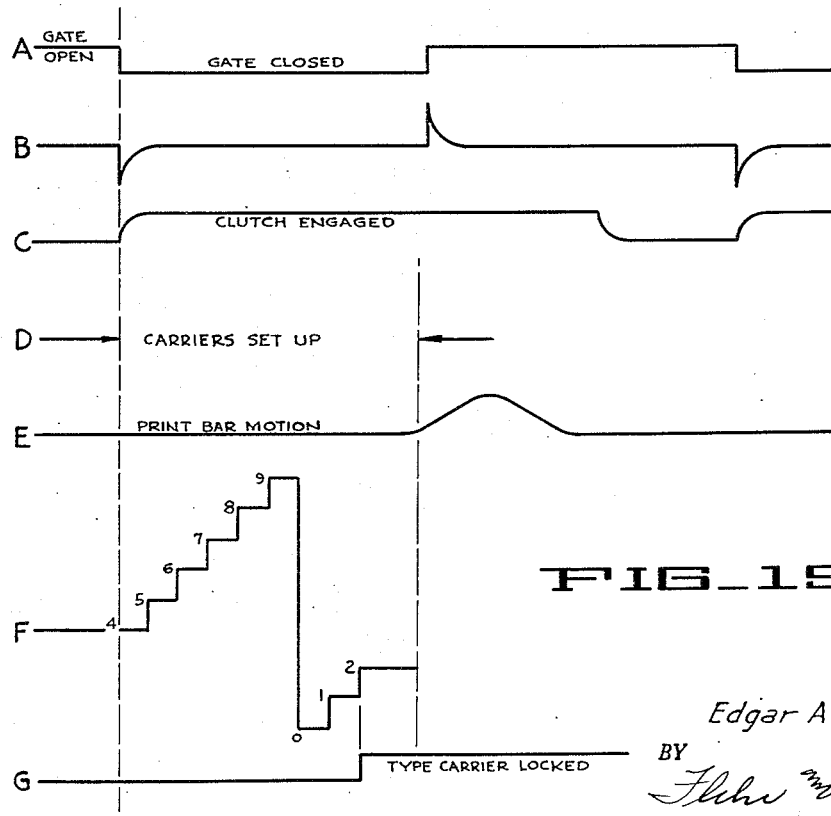
FIG_15_
INVENTOR.
Edgar A. Hilton
BY
ATTORNEYS June 25, 1957  E. A. HILTON  2,796,830
DATA CONTROLLED SELECTIVE PRINTING SYSTEM
Filed Nov. 1, 1956  6 Sheets-Sheet 6
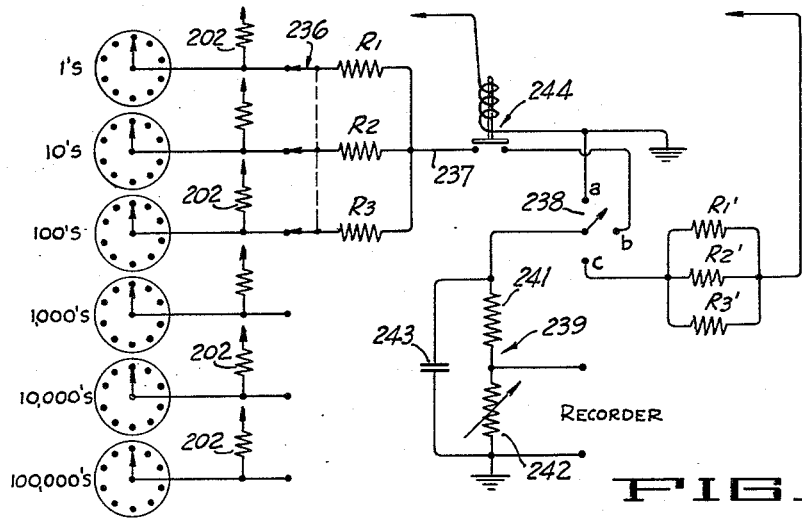
FIG_16_
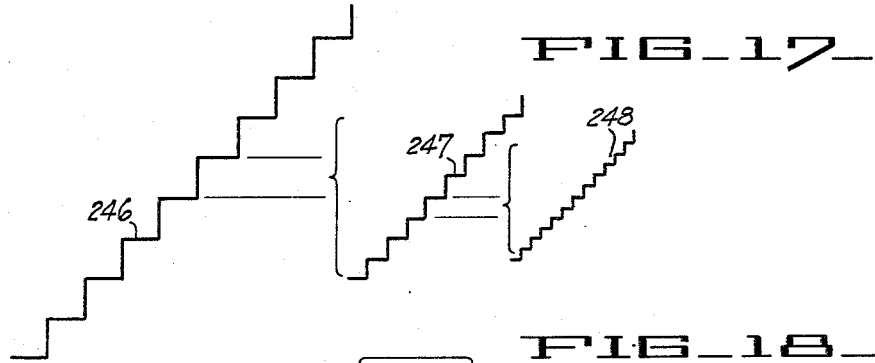
FIG_17_
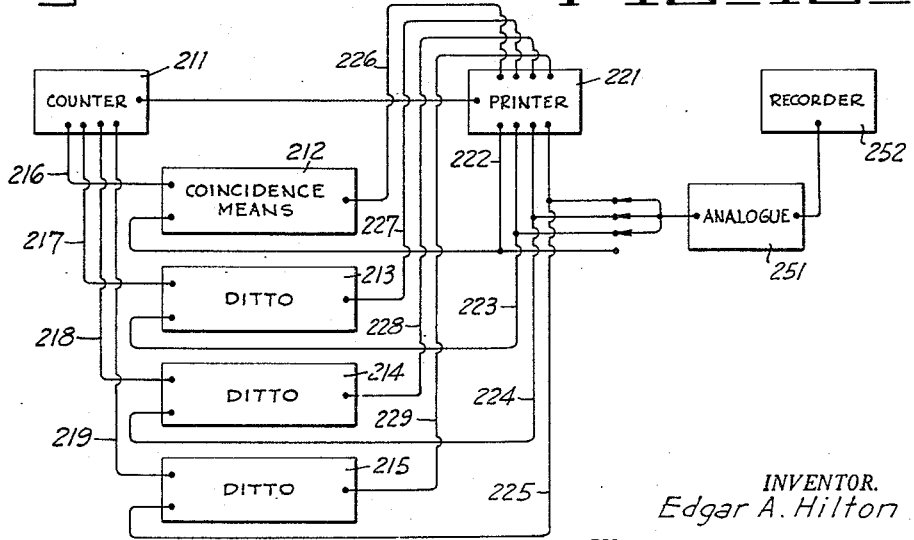
FIG_18_
INVENTOR.
Edgar A. Hilton
BY
ATTORNEYS

United States Patent Office 2,796,830
Patented June 25, 1957

2,796,830

DATA CONTROLLED SELECTIVE PRINTING SYSTEM

Edgar A. Hilton, Los Altos, Calif., assignor to Hewlett-Packard Company, Palo Alto, Calif., a corporation of California Application November 1, 1956, Serial No. 619,866

23 Claims. (Cl. 101—93)

This invention relates generally to a printing method and system, and more particularly to a printing method and system for printing and/or recording data such as displayed by electronic counters.

This application is a continuation-in-part of co-pending application Serial No. 527,907, filed August 12, 1955, for "Printing Method and System," now abandoned.

In electronic counters, frequency meters, time-rate indicators, etc., the data is usually displayed for a predetermined interval of time. The instrument is then recycled and a new set of data is obtained and displayed. Electronic counters of this type are described in co-pending applications entitled "Frequency Counter," filed July 23, 1953, Serial No. 300,447, and "Frequency Counter" filed April 15, 1954, Serial No. 423,409.

It is an object of the present invention to provide a printing method and system which serves to print data displayed by an instrument of the type described.

It is another object of the the present invention to provide a printing method and system in which a printing means is selectively operated to print data which is represented by distinctive potentials.

It is another object of this invention to provide a printing method and system in which source potentials are formed which represent the data to be printed, a plurality of reference potentials are formed each corresponding to a particular print character, and a coincidence means receives said potentials and selectively positions the print characters to print the data.

It is a further object of the present invention to provide a method and system in which source potentials are formed which correspond to the data to be printed, a plurality of reference potentials are formed which correspond to the individual print characters, the reference potentials are scanned, the potentials are applied to a coincidence circuit which serves to selectively position the print characters to print the data.

It is a further object of the present invention to provide a novel coincidence circuit.

It is still a further object of the present invention to provide a novel means for deriving reference potentials.

It is still a further object of the present invention to provide a system which develops an analogue voltage (or current) corresponding to the data displayed by the associated equipment and suitable for driving a strip chart recorder.

These and other objects of the present invention will appear more clearly from the following description when taken in conjunction with the accompanying drawing.

Referring to the drawing:

Figure 1 is a front elevational view of a printer which may be employed to carry out the invention;

Figure 2 is a sectional view taken along the line 2—2 of Figure 1;

Figure 3 shows a commutator suitable for deriving reference potentials;

Figure 4 is a plan view of the brush which may be employed to scan the commutator of Figure 3;

Figure 5 is a side elevational view of the brush of Figure 4;

Figure 6 is a side elevational view in section showing a type carrier, a commutator and brush, and a drive means;

Figure 7 shows means for forming reference potentials;

Figure 8 shows a circuit suitable for operating the magnetic clutch of Figure 1;

Figure 9 is a circuit diagram of a typical decade counter which has means for displaying the data and which provides a staircase output voltage which corresponds to the data;

Figure 10 shows a coincidence circuit which may be employed;

Figure 11 shows another coincidence circuit which may be employed;

Figure 12 shows still another coincidence circuit which may be employed.

Figure 13 shows a mixer circuit suitable for use with the coincidence circuits shown in Figures 10, 11 and 12;

Figure 14 is a block diagram of the printing system;

Figures 15a–15g show the sequence of operation of the printing system;

Figure 16 shows a suitable analogue read-out circuit;

Figure 17 shows typical analogue voltages; and

Figure 18 shows the novel printing and/or recording system.

In general, the printing system serves to print data which may be represented by distinctive source potentials. The printer is provided with a plurality of characters which correspond to the data. A plurality of reference potentials are formed, each corresponding to a particular print character. The reference potentials are scanned by suitable means. A coincidence circuit receives the source and reference potentials and generates a coincidence signal which selectively positions the print characters to print the data. The scanning means also serves to develop an analogue voltage which may be applied to a strip chart recorder to facilitate the analysis of the digital data carried or displayed by the data gathering equipment, for example a counter.

Figure 1 schematically illustrates printing equipment of the type which may be employed to carry out the invention. The base plate 11 carries the working parts. The motor 12 supplies the power for driving the printer. The motor may be any suitable motor which has sufficient power output to operate the printer. The motor 12 drives the shaft 13 which is journalled on the members 14 and 16 through suitable gearing. The gear reduction is such that an angular velocity suitable for driving the printer is obtained. For example, the gearing may comprise gears 17 and 18 having suitable diameters.

The power is transmitted to the printer through a suitable clutch designated generally by the reference numeral 19. The clutch comprises clutch plates 21 and 22 having mating teeth 23 and 24 respectively formed on their faces. The end 27 of the clutch arm 26 engages the annular groove 28 formed on the member 22. The other end of the arm is pivoted 29. A spring 31 is connected between the arm 26 and the member 32. The spring 31 pivots the arm 26 to urge the clutch into engagement. The electromagnetic means 33, which is energized at the leads 34 in a manner to be presently described, holds the arm 26 to keep the clutch 19 in its disengaged position. When the electromagnetic means 33 is deenergized, the arm 26 is released whereby the spring 31 pivots the arm 26 to engage the clutch. Power is transmitted to the associated printer. If the electromagnetic means is energized when the clutch is engaged, the pull exerted by the field of the electromagnetic means is not sufficient to disengage the clutch. A cam means for disengaging the clutch will be presently described.

With the clutch engaged, the shaft 36 journalled on the members 37 and 38 is rotated. The gear 39 is keyed to the shaft 36 and engages the gear 41 which is keyed to the shaft 42. The shaft 42 is likewise journalled on the members 37 and 38. The type carriers are carried by the shaft 42 in a manner to be presently described. The gears 39 and 41 are selected whereby the shaft 42 will rotate at a suitable angular velocity.

Cam 43 is carried by gear 39 and serves to engage the roller 44 whereby the clutch is disengaged at the end of each revolution of the shaft 36. The inertia of the system carries the cam past the roller 44. Thus, when the electromagnetic means 33 is de-energized, the clutch is engaged for another cycle of operation. The printing means undergoes a printing cycle each time the electromagnetic means 33 is deenergized.

As previously described, the shaft 42 carries one or more type carriers 46. Each of the type carriers comprise a portion 47 which serves to carry the type characters 50 and a portion 48 which is provided with detents 49. The detents 49 are engaged to position the carriers whereby a given character is held in print position, as will be presently described.

The type carriers 46 are rotatably mounted on the shaft 42 whereby the shaft may rotate while the carriers remain stationary. A drive member 52 is suitably coupled to the shaft for rotation therewith. For example, the member 52 may be keyed to the shaft. Referring particularly to Figure 6, a type carrier 46 and driving member 52 are shown in cross section. The drive means 52 is shown keyed to the shaft 42 by means of the key 53. A friction drive washer 54 is located between the drive member 52 and the type carrier 46. The friction member may, for example, be a felt washer, or a washer of other suitable material which provides a frictional drive between the drive member 52 and the type carrier 46. By applying appropriate pressure between the members 46 and 52, the type carrier 46 will rotate until it is locked. When the type carrier is locked, the friction clutch allows the shaft 42 and member 52 to rotate.

A brush 57 is attached to one face of the type carrier and serves to rotate against a commutator plate 56, to be presently described. A suitable brush is shown in Figures 4 and 5. The brush comprises an annular member having portions 58 and 59 formed on a segment thereof. The portions 58 and 59 act as the brush elements and are connected at the ends 61 and 62. The brush 57 is bent as shown in Figure 5 to provide pressure between the brush and the commutator.

The commutator 56 is formed with a plurality of segments 63. The number of segments 63 correspond to the number of print characters carried by the carrier 46. Suitable means are provided for making electrical connection to the segments 63a–63j. Referring to Figure 3, for example, the commutator members 63 are connected to the leads 64a–64j which have terminals 66a–66j. The annular member 67 is concentric with the segments 63 and connected to the lead 68 which is brought out to a suitable terminal 69. Thus, as the brushes 58 and 59 ride over the segments 63 and the ring 67, the segments are successively connected to the ring. As will be presently described, when suitable potentials are applied at the terminals 66a–66j, they are successively commutated to the terminals 69. A voltage appears at the terminal 69 which corresponds to the position of the type carrier.

Referring to Figure 2, a locking arm 71 is shown. The spring 72 is connected between the arm 71 and the member 73. The spring urges the arm 71 into engagement with one of the detents 49 whereby the type carrier may be locked. When the electromagnetic means 74, which may, for example, be a solenoid, is energized, the arm 71 is drawn toward the electromagnetic means and out of engagement with the detent 49. The type carrier is then free to rotate to bring the print characters successively into printing position. When the electromagnetic means is released, the arm 71 engages a detent to thereby lock the carrier in position. The corresponding print character is then in printing position. As will be presently described, the carrier is positioned during the first revolution of the shaft 42. The carriers are then kept in the locked position with the print characters in printing position until the shaft 36 urges the printing bar into print position. After a complete revolution of shaft 36, the clutch is disengaged and the printer is in readiness to undergo the next cycle. It is to be understood, of course, that although a single type carrier has been described, any desired number of carriers may be employed. Each carrier will have associated drives, arms, etc. of the type described.

The printing bar 77 is located opposite the printing position. The bar 77 is urged out of printing position by suitable means such as springs 78. Paper on which the characters are to be printed passes between the bar 77 and the print characters which are in printing position. Suitable roller means are provided for advancing the paper. The means may be cyclically operated when the clutch is engaged to thereby advance the paper a predetermined distance. Suitable means are also provided for transferring the characters onto the paper when pressure is applied to the bar 77. For example, an inked ribbon 79 may be passed between the paper and the print characters whereby the pressure of the plate serves to print the characters onto the paper. It is also possible to employ paper of the type which carries its own carbon with which the characters are transferred. All such means are within the spirit and scope of this invention.

The cams 76 are keyed to the shaft 36 to rotate therewith. The cams are contoured whereby they engage the bar 77 during a portion of the revolution of the shaft 36 to urge it downwardly to apply pressure to the paper. The printing occurs after the first revolution of the shaft 42, when all of the type carriers are locked, as will be presently described.

The commutator 56 provides means whereby the print characters may be indexed. By applying distinctive potentials to the commutator segments 63a–63j, a potential will appear at the terminal 69 which is indicative of the character in the print position. Referring to Figure 7, means are shown for forming a suitable reference voltage. A voltage E is applied across the resistance 82. The resistor is provided with a plurality of taps 83a–83j. The potential appearing at each tap will depend upon its position along the resistor. These taps are connected to the terminals 66a–66j respectively. Thus the voltage appearing at the terminal 69 will increase step-wise as the segments 63 are scanned in a counterclockwise direction by the brushes 58 and 59. Although a commutator has been shown and described, it is to be understood that switches which are operated by the type carriers may be employed to give the same result.

Referring particularly to Figure 13, a staircase voltage 84 is shown which corresponds to a voltage which appears at the terminal 69 as the brushes are rotated to engage the successive segments. It is seen that means are provided for forming potentials which correspond to the particular print character which is in the printing position.

The printer may be used to print any data which may be represented by distinctive potential. For purposes of simplification, it will be described with reference to electronic counters of the type which are disclosed in the aforementioned copending applications. It should, nevertheless, be understood that the invention is not intended to be limited in this respect. In such counters, the unknown frequency is applied to the counting circuits when a fast gate is opened. When the fast gate closes, the counting circuits display the count until the time base generator triggers the reset circuits. The counting circuits are reset to zero and the gate is opened so that the next sample of unknown frequency may be counted.

The printer is adapted to print during the interval that the gate is closed and the count is being displayed. The pulse which serves to close the gate is utilized to deenergize the electromagnetic means 33 which initiates a print cycle.

A suitable circuit for deenergizing the electromagnetic means 33 is shown in Figure 8. The R–C network composed of resistor 91 and capacitor 92 serves to apply a negative pulse to the control grid of the tetrode 93. The screen 94 is connected to a suitable source of screen voltage $+V$. A suitable plate voltage supply is connected to the terminals 96 and 97. The plate current is applied directly to the electromagnetic clutch. The operating voltages are selected whereby the tube continuously conducts to keep the electromagnetic means energized. When the gate closes the R–C network develops a negative spike which momentarily cuts off the tube. At this time, the electromagnetic means releases the arm 26 whereby the clutch is engaged to drive the printing means through one cycle of operation. The tube goes immediately back into conduction whereby the electromagnetic means 33 engages the arm 26 when it is cammed.

Referring particularly to Figure 9, a decade counter of the type which is suitable for use in electronic counters is shown. The counter consists of four flip-flop or bistable multivibrator circuits 101, 102, 103 and 104 connected in cascade. Each of the circuits has two stable states. When V1 is conducting and V2 is cut off, or when V1 is cut off and V2 is conducting. Each of the tubes will stay in either position indefinitely. When a triggering pulse is applied, the conduction will switch rapidly from one tube to the other. The direct coupled network stabilizes the circuit once conduction has switched.

Since one tube is conducting heavily and the other tube is cut off, a positive trigger pulse will only affect the tube which is cut off, and a negative trigger pulse will only affect the tube which is conducting heavily. The circuit may be designed to trigger on pulses of only one polarity. For example, if both positive and negative pulses of equal amplitude are applied to the input, the circuit will trigger only on the negative pulses.

The flip-flop circuits shown are well known in the art. Two triggering pulses are required for one complete cycle of operation of each of the flip-flops. Each cycle of input wave form will produce only one triggering pulse, so two cycles at the input will be required to produce one output cycle. Thus, one flip-flop circuit will divide its input frequency by two. If a number of flip-flops are connected in cascade, the combination will divide by $2^n$, where $n$ is the number of flip-flops in cascade. Without feedback circuits, the circuit shown in Figure 9 will serve to give an output pulse along the line 106 when sixteen triggering pulses have been applied to the input.

A decimal counting system is more convenient than a binary system. If four flip-flops in cascade are made to go through a complete cycle of operation with ten input units instead of sixteen, a decade counter results. This is achieved by means of feedback circuits, as will be presently described.

The feedback circuits used in counters of this type are not to be confused with feedback circuits used in amplifiers. Counter feedback circuits are used to apply a pulse from one of the flip-flops in the chain to the input of an earlier flip-flop of the same chain. If the feedback pulse is of the correct polarity, it will trigger the flip-flop producing the same result as an additional input signal to the flip-flop. The feedback circuits used in the counters are arranged so they produce the same effect as six additional input pulses; thus, the four flip-flops in cascade will go through a complete cycle of operation in ten input pulses.

The first feedback network which comprises resistor 107 and capacitor 108 applies the output of the third flip-flop to one of the grids of the second flip-flop. When the fourth input pulse is received, the first three flip-flops change conduction and the output of the third is applied to the grid of the second. This pulse is positive and is applied to the non-conducting half of the stage, triggering it again and leaving the circuit in the same condition it would be in with six input pulses and no feedback. In this manner the circuit has been advanced by three by means of only one input pulse.

The second feedback circuit which is comprised of resistor 109 and capacitor 111 operates on the sixth input pulse. This network couples the fourth flip-flop to the third. The sixth input pulse switches are four flip-flops and produces a negative wave form on one of the plates of the fourth flip-flop. This pulse is applied to the conducting half of the third flip-flop, causing it to switch conduction and advance the circuit by four counts. Thus the two feedback networks produce six synthetic pulses. The circuit completes a cycle of operation with ten input pulses instead of the sixteen normally required.

To convert the decade divider to a decade counter, a system is required that will display the total number of input pulses received since the last output pulse. This is accomplished with ten neon lamps 112a–112j. These lamps are connected to a resistor matrix as shown.

The lamp system relies on the variation of plate voltage in the flip-flops for operation. The lamps light when the difference potentenial across them is sufficient. The resistor matrix is so arranged that this condition will exist only once for each lamp during the complete cycle of operation. Specifically, the lamp must be connected between the high voltage plate in the first flip-flop and two low voltage plates in the outer three flip-flops.

It is desirable to provide an output voltage which is proportional to the count. A staircase voltage is generated by connecting one plate of each flip-flop to a common point through a high resistance. This voltage is distinctive of the count and is employed in a manner to be presently described to position the print carriers. A typical output voltage on line 113 is shown in Figure 13, curve 114.

In one particular circuit, the staircase voltage varied between approximately 130 volts at the count of zero to 54 volts at the count of nine in nine equal steps. It is apparent that by connecting decades in cascade higher counts may be obtained. The output voltage of each decade will represent its count.

Thus it is seen that a plurality of source voltages are formed which correspond to the count being displayed by the electronic counter. A second set of voltages are generated which correspond to the particular type character which is in the print position for each of the type carriers. Thus, if means can be provided for selectively operating the printer when these voltages have a predetermined relationship, it is possible to print the data which is displayed by the electronic counter.

As previously described, the print characters are positioned when the electromagnetic means 74 is released to allow the arm 71 to lock an associated print wheel. Coincidence circuits which are suitable for energizing the electromagnetic means are shown in Figures 10–12. The circuits illustrated maintain the electromagnetic means energized until the combined source and reference have a predetermined magnitude. When this magnitude is reached, the voltages are in coincidence and the electromagnetic means 74 is deenergized to thereby lock the associated print wheel in a particular position whereby the character corresponding to the count being displayed is opposite the printing platen.

A suitable coincidence circuit is shown in Figure 10. The circuit comprises a balanced comparator including the tubes 121 and 122 and amplifier tubes 123 and 124. The comparator is a cathode coupled twin triode with the grid of tube 122 connected to a D.-C. reference voltage source 126. A suitable high frequency A.-C. voltage, for example, 500 kc. signal at one volt, is superimposed on the D.-C. reference voltage.

The staircase voltages are combined and applied to line 127 which is connected to the grid of the tube 121. The plate of the tube 121 is connected to a plate supply voltage through the resistor 128. The plate of the tube 122 is connected directly to the plate voltage supply. The cathodes of the tubes 121 and 122 are coupled through a resistive network. The cathodes are connected through serially connected diodes 129, 131. The cathode of the tube 122 is connected to ground through the series combination of resistors 132, 133. The cathode of the tube 121 is connected to ground through the serially connected resistor 134 and capacitor 136. The common junctions of the resistors 132, 133 and of the resistor 134 and capacitor 136 are interconnected and resistively connected through the resistor 137 to the common junction of the diodes 129, 131.

The output of the tube 121 is capacitively coupled to the grid of the tube 123. Thus, the common junction of the serially connected capacitor 141 and resistor 142 is connected to the grid. The plate of the tube 123 is connected to the plate voltage supply +V through the resistor 143. The plate is also connected to a detector circuit through the capacitor 144. The detector circuit comprises the diodes 146 and 147 which have their common terminal connected to capacitor 144. The diode 146 is grounded. The diode 147 is connected to the grid of tube 124. The grid is also connected to ground through the parallel combination of resistor 148 and capacitor 149. The cathode of the tube 124 is grounded and the plate is connected to the electromagnetic means 74 through the line 150.

Operation of the circuit described is as follows: The source and reference voltages are combined and applied to the grid of the tube 121. When the number opposite the print bar corresponds to the number displayed by the counter, a combined voltage having a predetermined magnitude is obtained. A reference D.-C. potential having a magnitude equal to the predetermined combined voltage at coincidence is applied to the grid of the tube 122. A high frequency A.-C. voltage is superimposed on the reference D.-C. voltage. The cathodes and plates are at approximately equal voltages and the current conducted by the tubes is equal. The circuit constants of the cathode network are chosen whereby both diodes conduct. The high frequency signal is transmitted through the diodes to the tube 121 and amplified thereby. For conditions where the combined voltage is greater than or less than the D.-C. reference voltage, one or the other of the diodes 129, 131 is not conducting. There is no A.-C. signal transfer from tube 122 to 121 and, consequently, no amplified A.-C. voltage appears at the plate of tube 121. In the non-coincident condition, the combined voltage is either less than or more than the predetermined voltage. At coincidence, equal voltages are applied to the grids of the tubes 121 and 122. At coincidence, the high frequency A.-C. signal is amplified by the tube 121 and applied to the grid of the amplifier tube 123 which serves to further amplify the same. The amplified signal which appears on the plate of the tube 123 is rectified by the diodes 146, 147 and applied to the grid of the tube 124. The signal serves to cut off the tube 124 whereby the electromagnetic means 74 is deenergized to release the arm 71 and lock the print carrier wheel whereby the print character corresponding to the data being displayed is locked opposite the printing bar. For all other conditions, there is no amplified A.-C. signal and the tube 124 maintains the electromagnetic means 74 energized.

Other coincidence circuits may be employed for controlling the energization of the electromagnetic means 74. For example, a bridge type circuit such as illustrated in Figure 11 may be employed. The triodes 151, 152 are included in two legs of the bridge circuit. The grid 153 of the triode 151 serves to receive the combined reference and source potentials. The triode 152 has its grid 154 connected to a D.-C. reference voltage. The plates 156, 157 are connected to a suitable voltage supply 158 through the resistors 159, 161, respectively. The cathodes 162 and 163 are connected to ground through the series combination of resistors 164, 166 and 167, 168, respectively. The diode 169 is connected between the cathode 162 and the common terminal of the resistors 167 and 168. A second diode 171 is connected between the cathode 163 and the common junction of the resistors 164 and 166.

When the fixed D.-C. voltage applied to the grid 154 differs from the combined voltage applied to the grid 153, a current will flow through the coils of the electromagnetic means 74, thereby maintaining the same energized. When the signal applied to the grid 153 is equal to the signal applied to the grid 154, the voltage between the plates is reduced and a current which is insufficient to energize the electromagnetic means flows through the coil of the same. Thus, the arm 71 is released to lock the associated type carrier in printing position. For simplicity, the decrease of current to this value is referred to as the "coincidence signal."

The diodes 169, 171 conduct and connect the associated cathodes to ground through a relatively low resistance when the combined voltage has a magnitude which is larger or smaller than the fixed D.-C. voltage. Under these conditions, the tubes have a relatively high gain. When the combined and D.-C. reference voltages are near one another, the diodes are cut off. The cathodes are grounded through the series resistors, and the gain is relatively low. As a result, the sensitivity of the coincidence circuit is reduced near coincidence. Thus there is a range of potential near coincidence where the electromagnetic means is released. Variations in potentials will not interfere with the operation of the printer.

Another suitable circuit is shown in Figure 12. The circuit comprises a first amplifier tube 176, a detector tube 177, and a second amplifier tube 178. A suitable D.-C. voltage is applied to the screen grid 179. A carrier signal is applied to the control grid 181 through the resistor 182. The combined signal which is derived from the source and reference potential is also applied to the grid 181 through the resistor 183. The plate of the tube 176 is connected to a plate supply voltage source through the resistor 184. The plate is connected to the line 186 through the series combination of capacitor 187 and resistor 188. The suppressor grid 189 is directly connected to the cathode. The cathode of the detector tube 177 is connected to the common junction of the capacitor 187 and resistor 188. The plate 190 and grid 191 of the tube 177 are connected together and to the line 186 through the parallel combination of the capacitor 193 and resistor 192. The control grid 195 of the amplifier tube 178 is connected to the plate of the tube 177. The screen grid is connected to the plate supply voltage through the resistor 194. The suppressor grid 196 is connected to the cathode. The plate is connected to the electromagnetic means 74 and supplies exciting current thereto.

The tube 178 is normally conducting to energize the electromagnetic means 74. The voltage applied to the elements of the tube 176 are so chosen that the tube does not amplify the carrier signal until the combined voltage has a predetermined magnitude (coincident). When the voltages are coincident, the tube 176 amplifies the carriage signal and the amplified signal is applied to the detector tube 177. The detected signal is applied to the grid 193 and provides a negative voltage thereto to cut off the tube 178. The electromagnetic means is then deenergized and the arm 71 locks the associated type carrier with the corresponding print character in printing position.

It is noted that when the type carriers are locked in position, the circuits are coincident and the electromagnetic means 74 remain deenergized. The electromagnetic means are again energized during the next cycle of operation of the printer if the data associated therewith has changed. Suitable means, not shown, are provided for disconnecting the electromagnetic means during the time that an electronic counter associated therewith is going through a counting cycle, whereby vibration of the arms 71 is prevented.

In certain equipment, the reference and source potential may vary between different limits. For example, the source voltage supplied by the decade may be a decreasing voltage which varies between 138 and 54 volts, while the reference voltage supplied by the switching means (commutator) may be an increasing voltage which varies between 0 and 200 volts. In such event, it is desirable to provide a suitable circuit for combining or mixing the reference and source potentials for application to the coincidence circuit.

A suitable circuit is illustrated in Figure 13. The output of the decade is connected directly to the lead 201. The output of the commutator is connected to the lead 201 through the resistor 202. The value of the resistor is so chosen that the output of the commutator is attenuated to make its voltage steps 84 equal to the voltage steps 114 of the decade counter. The combined or mixed potentials are applied to the coincidence circuit. As previously described, the coincidence circuits give an output signal when the combined voltage from the staircase voltage 84 and staircase voltage 114 have a predetermined value.

Operation of the printing system will be more clearly understood with reference to Figures 14 and 15. Referring particularly to Figure 14, which is a block diagram of the system, the electronic counter 211 illustrated may include a plurality of decade counters connected in cascade. The staircase source voltages from the decade counters are applied to the coincidence circuits 212—215 along the lines 216—219, respectively. The printer 221 provides a plurality of reference voltages which correspond to the print character in the print position, as described, to the coincidence means 212—215 along the lines 222—225. The coincidence circuit 212—215 are connected to the printer along the lines 226—229. The coincidence signal from the coincidence means serves to selectively operate the associated type carriers whereby the digit represented by the counter 211 is printed. The gate voltage from the counter which initiates the print cycle is applied to the printer along the line 231.

Referring particularly to Figure 15, the sequence of operation is shown. Figure 15A shows the gate voltage at the counter. The gate is open for a predetermined period of time, at which time the voltage drops to close the gate. When the gate is closed, the count is displayed by the counter. The source voltages, which correspond to the data displayed by the counter, are available at the leads 216—219. Figure 15B shows the pulse which is applied to the grid 95 of the tube 93 by the R-C network composed of resistor 91 and capacitor 92. As previously described, this pulse serves to cut off the tube whereby the clutch is engaged as illustrated in Figure 15C. The printer then undergoes one cycle of operation and the clutch is disengaged by the cam means 43.

During the first revolution of the shaft 42, the type carriers are locked with the character corresponding to the digit displayed by the counter in printing position, as indicated in Figure 15D. During the last portion of the revolution of the shaft 36, the print bar is urged downwardly to print, as shown in the Figure 15E. The Figure 15F shows the voltage generated by the commutator of the printer. By way of example, it is assumed that the numeral "2" is displayed by the electronic counter. The reference voltage steps upward to 9, back to 0 and back up to 2, at which time the coincidence circuit forms a signal which serves to selectively lock the associated carrier, Figure 15G.

Although throughout this description reference is made to a single type carrier, the number of type carriers will correspond to the number of significant figures which are desired to be printed. Thus the operation of each type carrier is similar to that described in Figures 15A–15G for a single carrier. It is to be further understood that the invention is not to be limited to a printer which employs a rotary motion to position the type carriers. It is apparent that a printer which employs linear motion may be designed to operate in the manner described.

The analysis of the digital recorded data might become an extremely tedious operation since each of the printed digital numerals must be read and the data plotted and analyzed or analyzed directly. The printer and printing system described is admirably suited for producing an analogue voltage (or current) to drive a strip chart type recorder. In this way, the data is plotted directly on a strip chart which greatly facilitates its analysis.

Referring particularly to Figure 16, a system suitable for producing an analogue voltage is illustrated. The commutators and brushes for a printer which is adapted to print six figures are illustrated and appropriately marked to indicate ones, tens, hundreds, etc. As illustrated, the output from each of the brushes is applied to the resistor 202 which mixes the output of the commutator with the output from the associated decade counter to form a combined signal for application to the coincidence circuits. The brushes are also connected to the fixed contacts of a switch 236 which, as illustrated, includes three wipers adapted to contact any adjacent three of the contacts. The wipers are resistively connected to the line 237 through the resistors $R_1$, $R_2$ and $R_3$. The resistors $R_1$, $R_2$ and $R_3$ serve as a resistive mixer which mixes the current from the three brushes of the associated commutators in predetermined proportions. For example, if the resistor $R_1$ is equal to 100 $R_3$ and the resistor $R_2$ is equal to 10 $R_3$, then the currents will mix in the proportion of 90% corresponding to the 100's print carrier, 9% corresponding to the 10's print carrier, and .9% corresponding to the 1's print carrier. The mixed current flowing in the line 237 is more clearly illustrated in Figure 17 which will be presently described. The current from the line 237 is applied through the switch 238 to the resistive divider designated generally by the reference numeral 239 and comprising resistor 241 and adjustable resistor 242. A large capacitor 243 is shunted across the resistors for purposes to be presently described.

The switch 238 is a three-position switch. When switched to position $a$, no current is applied to the divider network. The strip chart recorder may be adjusted for zero reading. In the position $b$, the resistive divider network is connected to receive the mixed output current from the resistive mixer $R_1$, $R_2$ and $R_3$. When in the position $c$, the resistive divider is connected to a second mixer network comprising the resistors $R_1'$, $R_2'$ and $R_3'$. The other terminal of the resistors is connected to the terminal 83$j$ of the resistive divider which supplies the reference voltage to the various commutator contacts. Thus, if the resistors $R_1'$, $R_2'$, $R_3'$ have the same values as resistors $R_1$, $R_2$ and $R_3$, the current applied to the resistive divider network 239 will be the same as if all of the brushes of the commutator were in the 9 position. The recorder is then adjusted for a full scale reading by varying the resistor 242.

The relay 244 is connected in the line 237 and serves to disconnect the resistive network during the time that the print carriers are being set up. The capacitor 243 is chosen large whereby the time constant of the resistive-capacitive network including the resistors 241, 242 and capacitor 243 is long. Thus, the voltage decay across the resistors 241, 242 when the relay contact is open is very small. The recorder continues to record the previous analogue voltage. When the relay 244 is closed, the new analogue voltage is supplied to the recorder.

The mixing of the voltages is more clearly illustrated in Figure 17. The staircase current 246 represents the current through resistor $R_3$, the staircase current 247 represents the current through $R_2$, and the staircase current 248, the current through $R_1$. By properly selecting the resistors $R_1$, $R_2$ and $R_3$, as previously described, the total span of the current 247 may be made equal to one step of the current 246, while the current 248 is equal to one step of the current 247. Thus, the current output of the mixer is, in essence, a one-thousand step staircase current which results from the resistive mixing of the three staircase currents.

Variations of the last three digits in a varying six place counter reading may be plotted on the strip chart recorder. If higher digits are varying, then the switch 236 is switched to include these digits and to plot the resultant variations. In this manner, record of the digital data is made.

In Figure 18, a system which includes a counter, printer and strip chart recorder is illustrated. Like reference numerals correspond to like parts in Figure 14. The digital to analogue converter 251 is shown connected to the lines carrying the reference voltage from the printer. The output of the digital to analogue converter is applied to the strip chart recorder 252.

The expanded scale strip chart recording, if properly adjusted, never goes off scale since the variations are kept within fixed limits.

The accuracy obtainable with a mixer which includes three resistances is very high. More resistors may be employed to mix a larger number of staircase currents. However, the accuracy with which the resistors must be wound becomes very high. Further, available strip chart recorders are not sensitive enough to detect additional voltage steps. Thus, fourth or fifth resistors are not warranted.

It is apparent that the printer may be employed only to convert from digital to analogue, if desired. In such event, print characters would not be required.

Thus it is seen that a novel printing system has been described. The data to be printed is represented by source potentials. Reference potentials are formed which correspond thereto and to particular print characters, and means are provided for selectively positioning the print carriers to print the data. To facilitate analysis of the data, a digital to analogue conversion may be carried out by the printing mechanism and provides a continuous record of variations in the data on an expanded scale basis.

I claim:

1. In a printing system, a printer, means forming source potentials corresponding to the character to be printed, means forming reference potentials each corresponding to a particular source potential, means for combining said reference and source potentials to form a third potential, coincidence means connected to receive said third potential and serving to form a coincidence signal when the third potential has a predetermined amplitude, and electromagnetic means for selectively operating the printer in response to the coincidence signal.

2. In a printing system, a printer, means forming source potentials corresponding to a character to be printed, means forming reference potentials each corresponding to a particular source potential, said potentials being combined to form a third potential, electromagnetic means for selectively operating the printer, and coincidence means connected to receive said third potential and serving to maintain the electromagnetic means energized until the third potential has a predetermined amplitude, at which time the electromagnetic means is deenergized to selectively operate the printer.

3. Apparatus as in claim 2 wherein said coincidence means includes a vacuum tube having at least plate, grid and cathode elements and having the electromagnetic means connected in the plate circuit thereof, said tube being biased to be normally conducting to energize said electromagnetic means, amplifying means having a high frequency signal and the third potential applied thereto, said amplifier being biased whereby the high frequency signal is amplified when the third potential reaches a predetermined value, and means serving to detect the amplified high frequency signal and apply the same to the tube to cut off the same whereby the electromagnetic means is deenergized to selectively operate the printer.

4. Apparatus as in claim 2 wherein said coincidence means comprises a first vacuum tube having at least plate, grid and cathode elements, said tube serving to supply power to said electromagnetic means, a second vacuum tube having at least plate, grid and cathode elements, said grid being connected to receive the third potential, means serving to apply a high frequency signal to said grid, said tube being biased whereby the high frequency is amplified when the potentials are coincident, and means serving to detect the amplified high frequency signal and bias the grid of the first tube whereby the tube is cut off to deenergize the electromagnetic means and selectively operate the printer.

5. Apparatus as in claim 2 wherein said coincidence means comprises a first vacuum tube having at least plate, grid and cathode elements, said tube serving to supply power to said electromagnetic means and being biased to be normally conducting to energize the same, a balanced comparator, said comparator serving to receive said third voltage and a reference voltage having a high frequency signal imposed thereon, said comparator serving to amplify said high frequency signal when the third voltage has a predetermined amplitude, an amplifier serving to further amplify the high frequency signal, and detector means serving to detect said signal and apply the same to the grid of the first tube whereby the tube is cut off to deenergize the electromagnetic means and selectively operate the printer.

6. Apparatus as in claim 2 wherein said coincidence means comprises first and second vacuum tubes each having at least plate, grid and cathode elements, said tubes being connected in two legs of a bridge circuit, the grid of the first tube connected to receive the source and reference potentials, the grid of the second tube connected to a D.-C. voltage, the cathodes of said first and second tubes each connected to ground through a high resistance, first and second diodes, said first diode connected between the cathode of the first tube and a tap on the resistance associated with the cathode of the second tube, said second diode connected between the cathode of said second tube and a tap on the resistor of the first vacuum tube, whereby said diodes are non-conducting when the potentials have a predetermined value thereby reducing the gain and being conducting when the voltage deviates from said predetermined value to thereby increase the gain of the vacuum tubes.

7. In a printing system, means forming digital source potentials corresponding to the data, a commutator, means for applying reference potentials to said commutator, means for scanning said commutator, said reference potentials and said source potentials being combined to form a third voltage, means serving to receive said third voltage and serving to form a coincidence signal when the voltage has a predetermined amplitude, electromagnetic means serving to selectively operate said scanning means, said electromagnetic means being connected to receive said coincidence signal, and means serving to receive a plurality of said reference potentials and mix the same in a predetermined manner whereby an analogue potential corresponding to the digital data is formed.

8. In a printing system, a printer, means forming source potentials corresponding to the character to be printed, means forming reference potentials each corresponding to a particular source potential, means for combining said reference and source potentials and forming a third potential, electromagnetic means for selectively operating the printer, coincidence means connected to receive said third potential and serving to maintain the electromagnetic means energized until the third potential has a predetermined amplitude at which time the electromagnetic means is deenergized to selectively operate the printer, and means connected to receive preselected ones of said reference potentials and serving to mix the same in a predetermined manner whereby an analogue potential corresponding to the characters to be printed is formed.

9. A read-out printer of the type which serves to print data which is represented by source potentials comprising means serving to carry a plurality of type characters thereon, means for moving said characters successively into printing position, means serving to generate a plurality of reference potentials corresponding to the characters in print position, means serving to receive said source and reference potentials and form a third potential, coincidence means connected to receive said third potential and serving to form a coincidence signal when the third potential has a predetermined amplitude, electromagnetic means connected to said coincidence means and serving to be energized thereby, said coincidence means serving to deenergize said electromagnetic means when the third potential has a predetermined amplitude whereby the associated carriers are locked, means serving to print the characters in print position, and means for cyclically operating the printer.

10. Apparatus as in claim 9 wherein said coincidence means includes a vacuum tube having at least plate, grid and cathode elements and having the electromagnetic means connected in the plate circuit thereof, said tube being biased to be normally conducting to energize said electromagnetic means, amplifying means having a high frequency signal and the third potential applied thereto, said amplifier being biased whereby the high frequency signal is amplified when the third potential reaches a predetermined value, and means serving to detect the amplified high frequency signal and apply the same to the tube to cut off the same whereby the electromagnetic means is deenergized to selectively operate the printer.

11. Apparatus as in claim 9 wherein said coincidence means comprises a first vacuum tube having at least plate, grid and cathode elements, said tube serving to supply power to said electromagnetic means, a second vacuum tube having at least plate, grid and cathode elements, said grid being connected to receive the third potential, means serving to apply a high frequency signal to said grid, said tube being biased whereby the high frequency is amplified when the potentials are coincident, and means serving to detect the amplified high frequency signal and bias the grid of the first tube whereby the tube is cut off to deenergize the electromagnetic means and selectively operate the printer.

12. Apparatus as in claim 9 wherein said coincidence means comprises a first vacuum tube having at least plate, grid and cathode elements, said tube serving to supply power to said electromagnetic means and being biased to be normally conducting to energize the same, a balanced comparator, said comparator serving to receive said third voltage and a reference voltage having a high frequency signal imposed thereon, said comparator serving to amplify said high frequency signal when the third voltage has a predetermined amplitude, an amplifier serving to further amplify the high frequency signal, and detector means serving to detect said signal and apply the same to the grid of the first tube whereby the tube is cut off to deenergize the electromagnetic means and selectively operate the printer.

13. Apparatus as in claim 9 wherein said coincidence means comprises first and second vacuum tubes each having at least plate, grid and cathode elements, said tubes being connected in two legs of a bridge circuit, the grid of the first tube connected to receive the source and reference potentials, the grid of the second tube connected to a D.-C. voltage, the cathodes of said first and second tubes each connected to ground through a high resistance, first and second diodes, said first diode connected between the cathode of the first tube and a tap on the resistance associated with the cathode of the second tube, said second diode connected between the cathode of said second tube and a tap on the resistor of the first vacuum tube, whereby said diodes are non-conducting when the potentials have a predetermined value thereby reducing the gain and being conducting when the voltage deviates from said predetermined value to thereby increase the gain of the vacuum tubes.

14. A read-out printer of the type which serves to print data which is represented by source potentials comprising means serving to carry a plurality of type characters thereon, means for moving said characters successively into printing position, means serving to generate a plurality of reference potentials corresponding to the character in print position, electromagnetic means serving to selectively lock said carriers in response to a coincidence signal, coincidence means serving to receive said source and reference potentials and serving to maintain the electromagnetic means energized until the combined source and reference potentials have a predetermined amplitude, at which time the electromagnetic means is deenergized to selectively lock the associated type carrier, means serving to print the characters in print position, means cyclically operating the printer, and means connected to receive a plurality of said reference potentials and combining the same in a predetermined manner whereby an analogue potential of the data is formed.

15. Apparatus as in claim 14 wherein said coincidence means includes a vacuum tube having at least plate, grid and cathode elements and having the electromagnetic means connected in the plate circuit thereof, said tube being biased to be normally conducting to energize said electromagnetic means, amplifying means having a high frequency signal and the third potential applied thereto, said amplifier being biased whereby the high frequency signal is amplified when the third potential reaches a predetermined value, and means serving to detect the amplified high frequency signal and apply the same to the tube to cut off the same whereby the electromagnetic means is deenergized to selectively operate the printer.

16. Apparatus as in claim 14 wherein said coincidence means comprises a first vacuum tube having at least plate, grid and cathode elements, said tube serving to supply power to said electromagnetic means, a second vacuum tube having at least plate, grid and cathode elements, said grid being connected to receive the third potential, means serving to apply a high frequency signal to said grid, said tube being biased whereby the high frequency is amplified when the potentials are coincident, and means serving to detect the amplified high frequency signal and bias the grid of the first tube whereby the tube is cut off to deenergize the electromagnetic means and selectively operate the printer.

17. Apparatus as in claim 14 wherein said coincidence means comprises a first vacuum tube having at least plate, grid and cathode elements, said tube serving to supply power to said electromagnetic means and being biased to be normally conducting to energize the same, a balanced comparator, said comparator serving to receive said third voltage and a reference voltage having a high frequency signal imposed thereon, said comparator serving to amplify said high frequency signal when the third voltage has a predetermined amplitude, an amplifier serving to further amplify the high frequency signal, and detector means serving to detect said signal and apply the same to the grid of the first tube whereby the tube is cut off to deenergize the electromagnetic means and selectively operate the printer.

18. Apparatus as in claim 14 wherein said coincidence means comprises first and second vacuum tubes each having at least plate, grid and cathode elements, said tubes being connected in two legs of a bridge circuit, the grid of the first tube connected to receive the source and reference potentials, the grid of the second tube connected to a D.-C. voltage, the cathodes of said first and second tubes each connected to ground through a high resistance, first and second diodes, said first diode connected between the cathode of the first tube and a tap on the resistance associated with the cathode of the second tube, said second diode connected between the cathode of said second tube and a tap on the resistor of the first vacuum tube, whereby said diodes are non-conducting when the potentials have a predetermined value thereby reducing the gain and being conducting when the voltage deviates from said predetermined value to thereby increase the gain of the vacuum tubes.

19. A read-out printer of the type which serves to print data which is represented by source potentials comprising a means serving to carry a plurality of type characters thereon, means for moving said characters successively into printing position, means serving to generate a plurality of reference potentials corresponding to the character in print position, coincidence means serving to receive said source and reference potentials and serving to form an output signal when said potentials are coincident, electromagnetic means connected to said coincidence means and serving to lock said carriers when said potentials are coincident, means serving to print the characters in print position, and means for cyclically operating the printer, said coincidence means comprising a first vacuum tube having at least plate, grid and cathode elements, said tube serving to supply power to said electromagnetic means, a second vacuum tube having at least plate, grid and cathode elements, said grid connected to receive the source and reference potentials, means serving to apply a high frequency signal to said grid, said tube being biased whereby the high frequency signal is amplified when the potentials are coincident, means serving to detect said amplified high frequency signal and bias the grid of said first vacuum tube whereby the tube is cut off whereby said electromagnetic means is deenergized and the print carriers locked.

20. A read-out printer of the type which serves to print data which is represented by source potentials comprising a means serving to carry a plurality of type characters thereon, means for moving said characters successively into printing position, means serving to generate a plurality of reference potentials corresponding to the character in print position, coincidence means serving to receive said source and reference potentials and serving to form an output signal when said potentials are coincident, electromagnetic means connected to said coincidence means and serving to lock said carriers when said potentials are coincident, means serving to print the characters in print position, and means for cyclically operating the printer, said coincidence means comprising first and second vacuum tubes each having at least plate, grid and cathode elements, said vacuum tubes connected in two legs of a bridge circuit, the grid of the first tube connected to receive the source and reference potentials, the grid of the second tube connected to a D.-C. voltage, the cathodes of said first and second tubes each connected to ground through a high resistance, first and second diodes, said first diode connected between the cathode of the first tube and a tap on the resistance associated with the cathode of the second tube, said second diode connected between the cathode of said second vacuum tube and a tap on the resistor of said first vacuum tube, whereby said diodes are non-conducting when the potentials are near coincidence thereby reducing the gain and conducting when not in coincidence thereby increasing the gain of the vacuum tubes.

21. A read-out printer of the type which serves to print data which is represented by a plurality of potentials comprising a means serving to carry a plurality of type carriers rotatably mounted on a common shaft, friction drive means associated with each of said type carriers and driven by the said shaft, said drive means serving to advance the characters on each of said carriers into print position, means serving to form a plurality of reference potentials each corresponding to the character in print position, a plurality of coincidence means serving to receive said source and reference potentials and serving to form coincidence signals when the associated potentials are coincident, electromagnetic means responsive to said coincidence signals and serving to lock the associated carrier when said potentials are coincident, means serving to print the characters in print position, and means for cyclically operating the printer, said coincidence means comprising a first vacuum tube having at least plate, grid and cathode elements, said tube serving to supply power to said electromagnetic means, a second vacuum tube having at least plate, grid and cathode elements, said grid connected to receive the source and reference potentials, means serving to apply a high frequency signal to said grid, said tube being biased whereby the high frequency signal is amplified when the potentials are coincident, means serving to detect said amplified high frequency signal and bias the grid of said first vacuum tube whereby the tube is cut off, whereby said electromagnetic means is deenergized and the print carriers locked.

22. A read-out printer of the type which serves to print data which is represented by a plurality of potentials comprising a means serving to carry a plurality of type carriers rotatably mounted on a common shaft, friction drive means associated with each of said type carriers and driven by the said shaft, said drive means serving to advance the characters on each of said carriers into print position, means serving to form a plurality of reference potentials each corresponding to the character in print position, a plurality of coincidence means serving to receive said source and reference potentials and serving to form coincidence signals when the associated potentials are coincident, electromagnetic means responsive to said coincidence signals and serving to lock the associated carrier when said potentials are coincident, means serving to print the characters in print position, and means for cyclically operating the printer, said coincidence means comprising first and second vacuum tubes each having at least plate, grid and cathode elements, said vacuum tubes connected in two legs of a bridge circuit, the grid of the first tube connected to receive the source and reference potentials, the grid of the second tube connected to a D.-C. voltage, the cathodes of said first and second tubes each connected to ground through a high resistance, first and second diodes, said first diode connected between the cathode of the first tube and a tap on the resistance associated with the cathode of the second tube, said second diode connected between the cathode of said second vacuum tube and a tap on the resistor of said first vacuum tube, whereby said diodes are non-conducting when the potentials are near coincidence thereby reducing the gain and conducting when not in coincidence thereby increasing the gain of the vacuum tubes.

23. In a printing system, means forming digital source potentials corresponding to the data, a commutator, means for applying reference potentials to said commutator, means for scanning said commutator, said scanned reference potentials and said source potentials being combined to form a third voltage, means serving to receive said third voltage and serving to form a coincidence signal when the voltage has a predetermined amplitude, electromagnetic means connected to receive said coincidence signal and serving to selectively operate said scanning means, and a plurality of resistors each serving to receive a scanned reference potential and connected to combine the reference potentials in predetermined proportions to form an analogue voltage.

No references cited.